United States Patent
Sonoda et al.

(10) Patent No.: US 9,541,655 B2
(45) Date of Patent: Jan. 10, 2017

(54) IMAGING APPARATUS, CURRENT/VOLTAGE CONVERSION CIRCUIT, AND IMAGING METHOD

(71) Applicant: Sony Corporation, Tokyo (JP)

(72) Inventors: Takahiro Sonoda, Kagoshima (JP); Atsushi Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/597,612

(22) Filed: Jan. 15, 2015

(65) Prior Publication Data

US 2015/0219772 A1 Aug. 6, 2015

(30) Foreign Application Priority Data

Feb. 4, 2014 (JP) .................. 2014-019547

(51) Int. Cl.
G01T 1/208 (2006.01)
G01T 1/24 (2006.01)
G01T 1/20 (2006.01)

(52) U.S. Cl.
CPC ............. *G01T 1/247* (2013.01); *G01T 1/2018* (2013.01)

(58) Field of Classification Search
CPC ........ H04N 5/378; H04N 5/3575; H04N 5/32; G01T 1/2018; G01T 1/247
See application file for complete search history.

(56) References Cited

U.S. PATENT DOCUMENTS

| | | | |
|---|---|---|---|
| 6,587,143 B1* | 7/2003 | Boisvert | 348/241 |
| 8,063,961 B2* | 11/2011 | Cho | H03F 1/02 327/94 |
| 2009/0273386 A1* | 11/2009 | Korobeynikov et al. | 327/337 |
| 2009/0273392 A1* | 11/2009 | Korobeynikov | H03K 5/24 327/551 |
| 2009/0303358 A1* | 12/2009 | Kawahito | 348/255 |
| 2011/0193999 A1* | 8/2011 | Gilg et al. | 348/262 |
| 2012/0025063 A1* | 2/2012 | Woodbury et al. | 250/214 A |
| 2013/0135503 A1* | 5/2013 | Park et al. | 348/308 |
| 2014/0048683 A1* | 2/2014 | Soh et al. | 250/208.1 |
| 2015/0237276 A1* | 8/2015 | Hynecek | 348/300 |

FOREIGN PATENT DOCUMENTS

JP 2010-098621 4/2010

* cited by examiner

*Primary Examiner* — Marcus Taningco
(74) *Attorney, Agent, or Firm* — Michael Best & Friedrich LLP

(57) ABSTRACT

An imaging apparatus includes an image sensor configured to convert an incident electromagnetic wave into current; a current/voltage conversion circuit that is configured to convert the current input from the image sensor into voltage and includes an operational amplifier configured to output voltage corresponding to the current input from the image sensor; and a sampling circuit that is configured to sample output of the operation amplifier and is provided between input/output terminals of the operational amplifier.

20 Claims, 9 Drawing Sheets

IMAGING APPARATUS, CURRENT/VOLTAGE CONVERSION CIRCUIT, AND IMAGING METHOD

CROSS REFERENCE TO RELATED APPLICATIONS

This application claims the benefit of Japanese Priority Patent Application JP 2014-019547 filed Feb. 4, 2014, the entire contents of which are incorporated herein by reference.

BACKGROUND

The present disclosure relates to an imaging apparatus, a current/voltage conversion circuit, and an imaging method.

In the past, a transmission X-ray imaging technique in which the internal state of a living body or object is observed by the applying X-rays to the living body or object and detecting transmitted X-ray for visualization has been known. In the transmission X-ray imaging technique, a photographic plate or photograph film has been used to detect the transmitted X-ray. In recent years, however, a flat panel detector has been developed extensively (see, for example, Japanese Patent Application Laid-open No. 2010-098621).

The flat panel detector employs one of two methods: a direct conversion method in which an X-ray is directly converted into an electric signal; and an indirect conversion method in which an X-ray is converted into an optical signal before the optical signal is converted into an electric signal. With any of the methods, it does not need to use a film, and it is possible to improve image quality and support diagnosis using digital image processing. In addition, the flat panel detector has such advantages that electronic filing or networking of a transmitted X-ray image can be easily performed, for example, and is expected to be used in various fields.

FIG. 21 is an equivalent circuit schematic showing an example of an image sensor and a current/voltage conversion circuit constituting a flat panel detector. The flat panel detector shown in FIG. 21 includes a plurality of (M×N) image sensors 230 arranged in a two-dimensional matrix pattern in an X-direction and Y-direction, and is configured to convert an incident X-ray into current directly (direct conversion method) or indirectly (indirect conversion method).

The plurality of (M) image sensors 230 arranged in the X-direction are connected to one current/voltage conversion circuit 240 via a switching circuit 232 and a row wiring 233. The current/voltage conversion circuit 240 is configured to successively convert current input from each image sensor into voltage. In FIG. 21, the reference number 231 represents a parasitic capacitance (capacity value: $C_{pd}$) of the image sensors 230.

The current/voltage conversion circuit 240 is a well-known current/voltage conversion circuit (a kind of integration circuit) including an operational amplifier 241, a capacitor unit 242 (capacity value: $C_{int}$), and a short circuit 243 having a reset switching circuit 244. To a non-inversion input unit of the operational amplifier 241, a reference voltage $V_{ref}$ is input. The non-inversion input unit of the operational amplifier 241 is connected to the row wiring 233. The capacitor unit 242 and the short circuit 243 are connected to each other in parallel, and are connected to an inversion input unit and an output unit of the operational amplifier 241.

SUMMARY

However, in the existing current/voltage conversion circuit 240 shown in FIG. 21, amplifier noise, which is input referred noise in a non-inversion input terminal of the operational amplifier 241, (noise generated in only the operational amplifier 241) and integrated noise of switch on-resistance (k×T/C noise) generated by the resetting operation (resetting and releasing the resetting) of the integration capacity 242 using the reset switching circuit 244 are added to a signal component with a gain of $C_L/C_{int}$ ($C_L$ represents a parasitic capacitance of the row wiring 233). Therefore, it is difficult to achieve noise reduction in micro-optical sensing in which high current/voltage conversion efficiency (increasing $1/C_{int}$) and increase in the area of the image sensors 230 (increasing $C_{pd}$) are desired.

It is desirable to achieve noise reduction in micro-optical sensing in an imaging apparatus, a current/voltage conversion circuit, and an imaging method.

According to an embodiment of the present disclosure, there is provided an imaging apparatus including an image sensor configured to convert an incident electromagnetic wave into current, a current/voltage conversion circuit that is configured to convert the current input from the image sensor into voltage and includes an operational amplifier configured to output voltage corresponding to the current input from the image sensor, and a sampling circuit that is configured to sample output of the operation amplifier and is provided between input/output terminals of the operational amplifier.

Moreover, according to an embodiment of the present disclosure, there is provided a current/voltage conversion circuit that converts current input from an image sensor into voltage, including: an operational amplifier configured to output voltage depending on the current input from the image sensor, and a sampling circuit that is configured to sample output of the operation amplifier and is provided between input/output terminals of the operation amplifier, the image sensor being configured to convert an incident electromagnetic wave into the current.

It should be noted that an imaging apparatus or a current/voltage conversion circuit according to an embodiment of the present disclosure includes various embodiments. For example, the imaging apparatus or the current/voltage conversion circuit is implemented in the state of being incorporated into another apparatus, or is implemented with another method. Moreover, embodiments of the present disclosure can be achieved by an imaging system or current/voltage conversion system including the imaging apparatus or the current/voltage conversion circuit, an imaging method including steps corresponding to the configuration of the above-mentioned apparatus, a program that causes a computer to execute the function corresponding to the configuration of the above-mentioned apparatus, a computer-readable storage medium that stores the program, and the like.

In the embodiments of the present disclosure, a sampling circuit that samples the output of an operation amplifier is provided between input/output terminals of the operational amplifier. Therefore, it is possible to achieve noise reduction in micro-optical sensing in an imaging apparatus, a current/voltage conversion circuit, and an imaging method.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings in the following order.

(1) First embodiment
(2) Second embodiment
(3) Conclusion (1) First Embodiment

Figure 1:
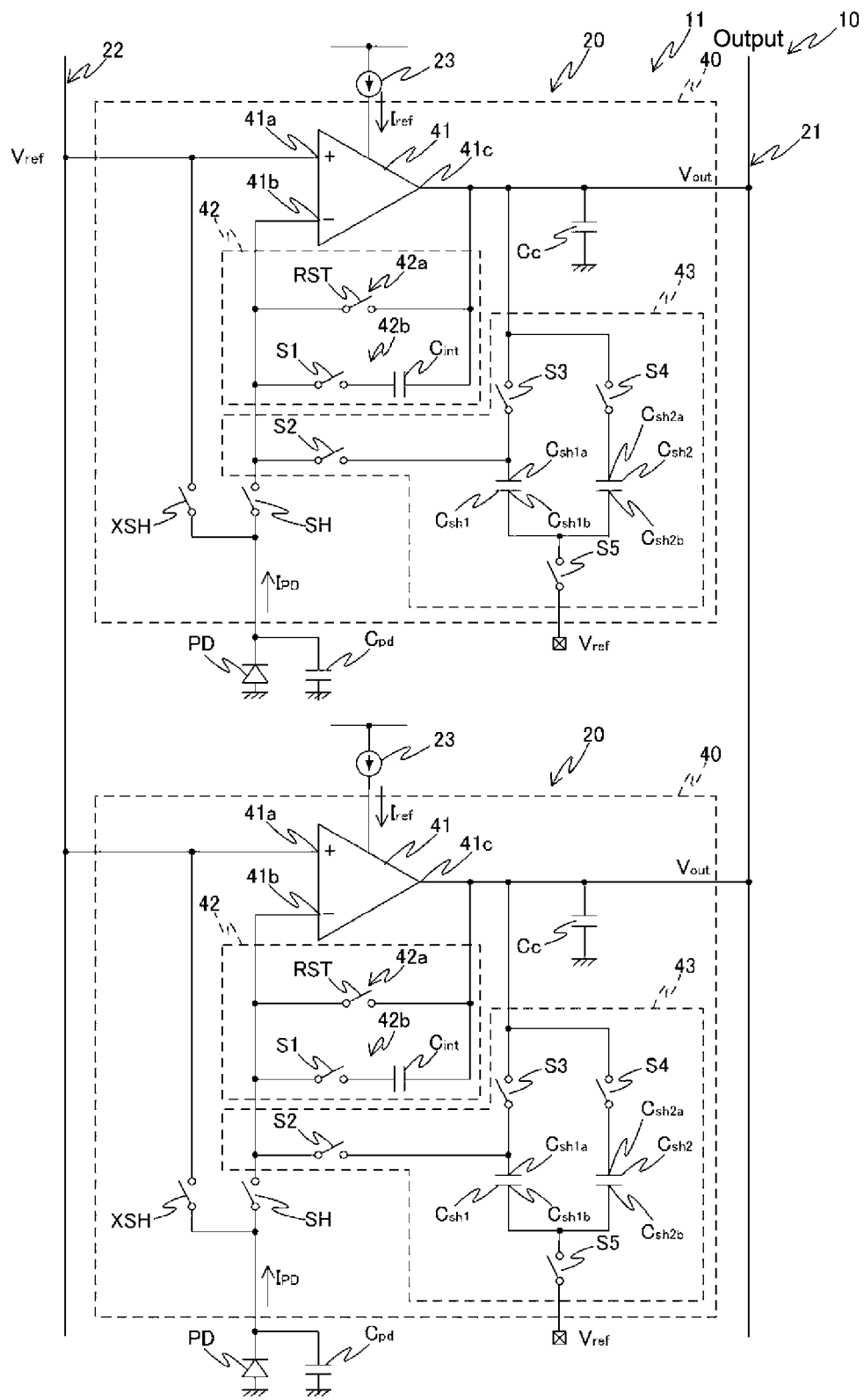
FIG. 1 is an equivalent circuit schematic showing a part of an imaging apparatus according to an embodiment of the present disclosure.

FIG. 1 is an equivalent circuit schematic showing a part of an imaging apparatus according to a first embodiment of the present disclosure (equivalent circuit schematic showing two image sensor units connected to one output wiring). The imaging apparatus (specifically, flat panel detector) 10 according to this embodiment includes an imaging panel 11 in which image sensor units 20 constituting one pixel or a plurality of pixels (in this embodiment, specifically, one pixel) are arranged in a two-dimensional matrix pattern (see also FIG. 8).

(Image Sensor Unit)

Each image sensor unit 20 includes an image sensor PD configured to convert an incident electromagnetic wave (in this embodiment, specifically, X-ray) into current (charge), and a current/voltage conversion circuit 40 configured to convert the current (charge) input from the image sensor PD into voltage. As the entire configuration and structure of a flat panel detector and an imaging apparatus, well-known configuration and structure can be employed.

(Current/Voltage Conversion Circuit)

The current/voltage conversion circuit 40 is a kind of integration circuit, and includes an operational amplifier 41, a feedback unit 42 that is arranged between input/output terminals of the operational amplifier 41 (between a second input unit 41b and an output unit 41c to be described later), and a CDS unit 43.

(Operational Amplifier)

The operational amplifier 41 includes the output unit 41c connected to the output unit of the current/voltage conversion circuit 40, a first input unit (non-inversion input unit) 41a, and the second input unit (inversion input unit) 41b. The first input unit 41a is connected to a line 22 that functions as a voltage source of a reference voltage $V_{ref}$, and to a current output terminal (in this embodiment, specifically, a cathode terminal) of the image sensor PD via a switch circuit XSH. The second input unit 41b is connected to the current output terminal of the image sensor PD via a switch circuit SH serving as a first switch circuit. To the output unit 41c connected to the output unit of the current/voltage conversion circuit 40, a coupling capacitor Cc is connected.

(Feedback Unit)

The feedback unit 42 is a circuit that is configured to provide feedback of output voltage of the output unit 41c to the second input unit 41b, and includes a feedback capacity unit 42b and a short circuit 42a. The feedback capacity unit 42b is configured to switch on and off of the feedback from the output unit 41c to the second input unit 41b via an integration capacity $C_{int}$, and the short circuit 42a is configured to reset a stored charge of the integration capacity $C_{int}$ by causing short circuit in the integration capacity $C_{int}$.

(Short Circuit)

The short circuit 42a has a configuration where a switch circuit RST connects the output unit 41c of the operational amplifier 41 with the second input unit 41b. When the switch circuit RST is turned on, the output unit 41c of the operational amplifier 41 and the second input unit 41b are short-circuited. On the other hand, when the switch circuit RST is turned off, the short-circuiting of the output unit 41c of the operational amplifier 41 and the second input unit 41b by the switch circuit RST is eliminated.

(Feedback Capacity Unit)

The feedback capacity unit 42b includes the integration capacity $C_{int}$ and a switch circuit S1 connected in series, and has a configuration where the output unit 41c of the operational amplifier 41 and the second input unit 41b are connected to each other. When the switch circuit S1 is turned on, the integration capacity $C_{int}$ connects the output unit 41c of the operational amplifier 41 with the second input unit 41b. On the other hand, when the switch circuit S1 is turned off, the integration capacity $C_{int}$ is separated from the output unit 41c of the operational amplifier 41 and the second input unit 41b.

(CDS Unit)

The CDS unit 43 includes switch circuits S2 to S5 and capacities $C_{sh1}$ and $C_{sh2}$. In this embodiment, the capacity $C_{sh1}$ constitutes the first capacity and the capacity $C_{sh2}$ constitutes the second capacity. Moreover, in this embodiment, the capacity $C_{sh1}$ serving as the first capacity, the switch circuits S2 to S5 that cause the capacity $C_{sh1}$ to sample a noise component of output voltage of the operational amplifier 41, and the switch circuit SH to be described later constitute a first sampling unit. Moreover, in this embodiment, the capacity $C_{sh2}$ serving as the second capacity, the switch circuits S2 to S5 that cause the capacity $C_{sh2}$ to sample a noise component of output voltage of the operational amplifier 41, and the switch circuit SH to be described later constitute a second sampling unit. Moreover, in this embodiment, the switch circuit S2 constitutes a second switch circuit, the switch circuit S3 constitutes a third switch circuit, the switch circuit S4 constitutes a fourth switch circuit, and the switch circuit S5 constitutes a fifth switch circuit.

One terminal $C_{sh1a}$ of the capacity $C_{sh1}$ is connected to the output unit 41c of the operational amplifier 41 via the switch circuit S3 and is connected to the second input unit 41b of the operational amplifier 41 via the switch circuit S2. The terminal $C_{sh1a}$ is connected to the output unit 41c when the switch circuit S3 is turned on, and the terminal $C_{sh1a}$ is separated from the output unit 41c when the switch circuit S3 is turned off. Moreover, the terminal $C_{sh1a}$ is connected to the second input unit 41b when the switch circuit S2 is turned on, and the terminal $C_{sh1a}$ is separated from the second input unit 41b when the switch circuit S2 is turned off.

One terminal $C_{sh2a}$ of the capacity $C_{sh2}$ is connected to the output unit 41c of the operational amplifier 41 via the switch circuit S4. The terminal $C_{sh2a}$ is connected to the output unit 41c when the switch circuit S4 is turned on, and the terminal $C_{sh2a}$ is separated from the output unit 41c when the switch circuit S4 is turned off.

The other terminal $C_{sh1b}$ of the capacity $C_{sh1}$ and the other terminal $C_{sh2b}$ of the capacity $C_{sh2}$ are connected to the line 22 of the reference voltage $V_{ref}$ via the switch circuit S5. The terminal $C_{sh1b}$ and the terminal $C_{sh2b}$ are connected to the line 22 when the switch circuit S5 is turned on, and the terminal $C_{sh1b}$ and the terminal $C_{sh2b}$ are separated from the line 22 when the switch circuit S5 is turned off.

The CDS unit 43 configured as described above selects an appropriate combination of the on/off states of the switch circuits S2 to S5 under control of external controller (not shown), and thus, the capacity $C_{sh1}$ and the capacity $C_{sh2}$ can achieve various connection states between the output unit 41c of the operational amplifier 41 and the second input unit 41b.

For example, if the switch circuits S3 to S5 are turned on and the switch circuit S2 is turned off, the capacity $C_{sh1}$ and the capacity $C_{sh2}$ connected in parallel connect the output unit 41c of the operational amplifier 41 with the line 22 of the reference voltage $V_{ref}$. At this time, the capacity $C_{sh1}$ and the capacity $C_{sh2}$ connected in parallel function as a load capacity of the operational amplifier 41.

Moreover, if the switch circuits S4 and S5 are turned on and the switch circuits S2 and S3 are turned off, for example, the one terminal $C_{sh1a}$ of the capacity $C_{sh1}$ is opened, and the other terminal $C_{sh1b}$ is connected to the line 22 of the reference voltage $V_{ref}$ via the switch circuit S5. At this time, the capacity $C_{sh1}$ maintains the charges stored right before the terminal $C_{sh1a}$ is opened. On the other hand, the capacity $C_{sh2}$ functions as a load capacity of the operational amplifier 41 to connect the output unit 41c of the operational amplifier 41 with the line 22 of the reference voltage $V_{ref}$.

Moreover, if the switch circuit S5 is turned on and the switch circuits S2 to S4 are turned off, for example, the one terminal $C_{sh1a}$ of the capacity $C_{sh1}$ is opened, and the other terminal $C_{sh1a}$ is connected to the line 22 of the reference voltage $V_{ref}$ via the switch circuit S5. At this time, the capacity $C_{sh1}$ maintains the charges stored right before the terminal $C_{sh1a}$ is opened. Moreover, the one terminal $C_{sh2a}$ of the capacity $C_{sh2}$ is opened, and the other terminal $C_{sh2b}$ is connected to the line 22 of the reference voltage $V_{ref}$ via the switch circuit S5. At this time, the capacity $C_{sh2}$ maintains the charges stored right before the terminal $C_{sh2a}$ is opened.

Moreover, if the switch circuits S2 and S4 are turned on and the switch circuits S3 and S5 are turned off, for example, the capacity $C_{sh1}$ and the capacity $C_{sh2}$ connected in series connect the second input unit 41b of the operational amplifier 41 with the output unit 41c. At this time, an output voltage $V_{out}$ of the current/voltage conversion circuit 40 almost equals voltage obtained by reducing voltage depending on the charges stored in the capacity $C_{sh1}$ from voltage depending on the charges stored in the capacity $C_{sh2}$.

As described above, the CDS unit 43 can achieve various connection states between the output unit 41c of the operational amplifier 41 and the second input unit 41b with various combinations of the on/off states of the switch circuits S2 to S5, and can apply various types of sampling such as correlation double sampling to the output of the operational amplifier 41 by appropriately switching the connection states.

(Complementary Switch)

The switch circuit SH and the switch circuit XSH operate complementarily. The switch circuit SH is turned on when the switch circuit XSH is turned off, and the switch circuit XSH is turned on when the switch circuit SH is turned off. If the switch circuit SH is turned on, the current output terminal of the image sensor PD is connected to the second input unit 41b of the operational amplifier 41. If the switch circuit XSH is turned on, the current output terminal of the image sensor PD is connected to the first input unit 41a of the operational amplifier 41 and the line 22 of the reference voltage $V_{ref}$.

(Entire Operation of Current/Voltage Conversion Circuit)

In the imaging apparatus 10 configured as described above, an incident electromagnetic wave (X-ray) is converted into current by the image sensor PD, and charges are stored in the integration capacity $C_{int}$ or a parasitic capacitance $C_{pd}$ by current input from the image sensor PD. The output unit of the current/voltage conversion circuit 40 is connected to an output wiring 21. The operational amplifier 41 is driven by an operational amplifier power supply 23.

The output wiring 21 is connected to an image processing unit (not shown). The image processing unit includes, for example, an A/D conversion unit, a signal processing unit, and a display controller. The A/D conversion unit converts a voltage signal into a digital signal. The signal processing unit performs signal processing on the A/D converted digital signal. The display controller performs display control of image information after the signal processing. The image processing unit can be formed of a personal computer, for example.

The image sensor unit 20 is integrally formed. Specifically, the image sensor PD and the current/voltage conversion circuit 40 are integrally formed. It should be noted that the specific configuration and structure of the image sensor units 20 will be described in a second embodiment to be described later. Moreover, because components such as the image sensor units 20, the image sensor PD, a circuit or part constituting the current/voltage conversion circuit 40, the image sensor PD, and a circuit or part driving the image sensor units 20, can be a well-known circuit, part, or the like, detailed description thereof will be omitted.

(Regarding Noise)

It should be noted that in the following description, noise generated in a switch circuit or operation amplifier is represented by $N_{x\_y}$. In the $N_{x\_y}$, x represents a source of generated noise. It represents switch-on resistance noise of the switch circuit RST if x is rst, it represents noise of the operational amplifier 41 if x is amp, it represents switch on-resistance noise of the switch circuit S3 if x is S3, it represents switch on-resistance noise of the switch circuit S4 if x is S4, and it represents switch on-resistance noise of the switch circuit S5 if x is S5. Moreover, y represents an observation timing for noise. It represents noise observed in a reset mode to be described later if y is rst, it represents noise observed in a CDS mode to be described later if y is cds, and it represents noise observed in a sample mode to be described later if y is sam.

Moreover, in the following description, ∫a(f)df(a(f) represents an arbitrary formula) represents an integration range of 0 to ∞ unless particularly described. Moreover, it is well-known that in the case where there are a switch and a capacity connected in series between two low impedance nodes, the switch-on resistance noise generated at a capacity terminal at the moment when the switch is turned on and then is turned off is represented by (k×T)/C irrespective of the switch on-resistance (k: Boltzmann constant, T: absolute temperature, C: capacity value).

Hereinafter, the operations of the imaging apparatus and the current/voltage conversion circuit 40 according to the first embodiment will be described with reference to FIG. 2 to FIG. 6. FIG. 2 to FIG. 6 are each an equivalent circuit schematic showing the current/voltage conversion circuit 40. It should be noted that because a pixel component and a noise component in the output voltage $V_{out}$ are separated from each other, they are described separately in the following.

(Step S10 (Reset Mode))

Figure 2:
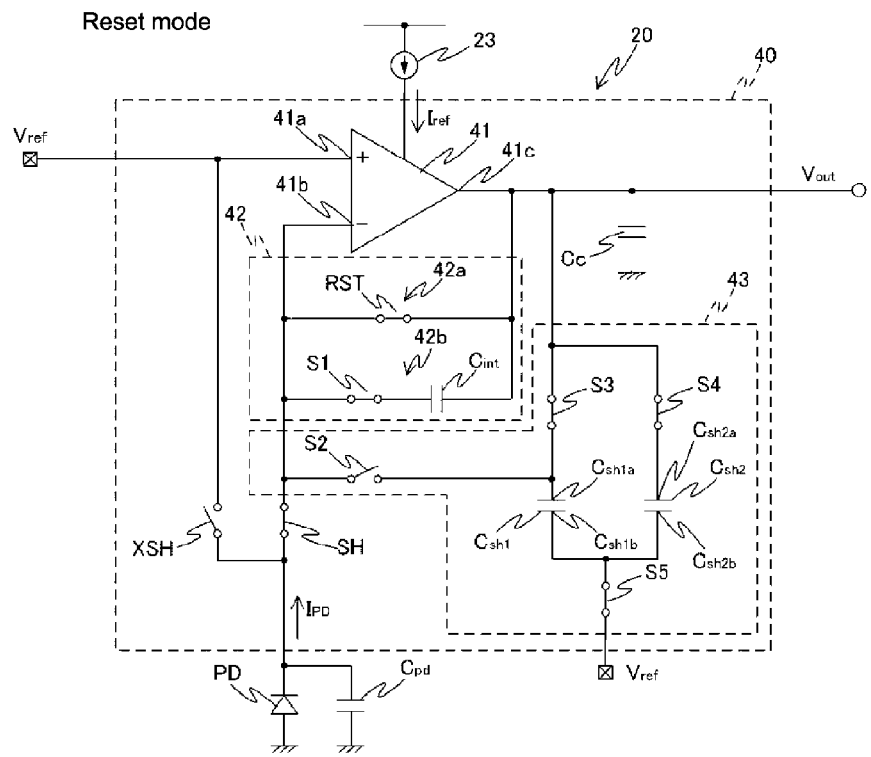
FIG. 2 is an equivalent circuit schematic showing a current/voltage conversion circuit according to this embodiment.

First, the integration capacity $C_{int}$ is initialized (Step S10). Specifically, the switch circuit RST for resetting is turned on in the state where a current $I_{ref}$ is supplied from the operational amplifier power supply 23 to the operational amplifier 41 to drive the operational amplifier 41 (FIG. 2).

At this time, the switch circuit S1 is turned on, and the integration capacity $C_{int}$ connects the second input unit 41b of the operational amplifier 41 with the output unit 41c, i.e., terminals of the switch circuit RST. Accordingly, the integration capacity $C_{int}$ is short-circuited via the short circuit 42a, the charges of the integration capacity $C_{int}$ are reset, and the potentials of both ends of the integration capacity $C_{int}$ are equal to each other.

Moreover, in the reset mode, the switch circuit S2 is turned off, the switch circuits S3 to S5 are turned on, and the switch circuit SH is turned on (the switch circuit XSH is turned off). By turning off the switch circuit S2, the CDS unit 43 is separated from the second input unit 41b of the operational amplifier 41. By turning on the switch circuit SH, the image sensor PD is connected to the second input unit 41b of the operational amplifier 41.

At this time, in the switch circuit RST and the switch circuit SH, switch on-resistance noise is generated. Due to the switch on-resistance noise of the switch circuit RST and the switch circuit SH, charges between terminals of the parasitic capacitance $C_{pd}$ and the integration capacity $C_{int}$ are constantly varied.

On the other hand, the voltage fluctuation caused due to the amplifier noise generated from the operational amplifier 41 is generated in the second input unit 41b of the operational amplifier 41 and the output unit 41c in the same way because the switch circuit RST causes short circuit in the terminals of the integration capacity $C_{int}$. Therefore, the charges caused due to the amplifier noise are not stored in the integration capacity $C_{int}$. However, charges with a gain of one time are stored in the parasitic capacitance $C_{pd}$. Specifically, in the parasitic capacitance $C_{pd}$, charges caused due to the switch on-resistance noise of the switch circuit RST and the amplifier noise of the operational amplifier 41 are stored.

(CDS Mode (Step S20))

In the subsequent Step S20, the CDS unit 43 samples a noise signal to be subtracted from the output voltage of the operational amplifier 41 by correlation double sampling.

Figure 3:
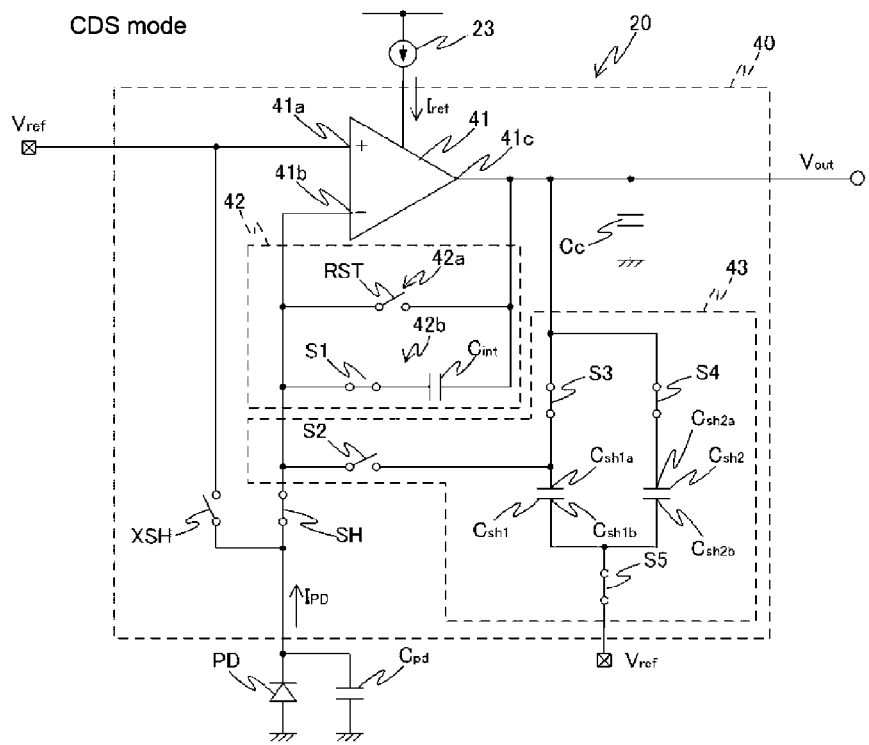
FIG. 3 is an equivalent circuit schematic showing the current/voltage conversion circuit according to this embodiment.

Specifically, after the integration capacity $C_{int}$ is reset (after the completion of Step S10) by the turning on of the switch circuit RST and the elapse of a predetermined time period, the switch circuit RST is turned off (FIG. 3). The complementary switch maintains on-state of the switch circuit SH (off-state of the switch circuit XSH) continuously, maintains on-state of the switch circuits S1, S3, S4, and S5 continuously, and maintains off-state of the switch circuit S2 continuously.

Accordingly, the charges of the switch on-resistance noise of the switch circuit RST stored in the integration capacity $C_{int}$ at the moment when the switch circuit RST is turned off are held in the integration capacity $C_{int}$ as they are. Moreover, the switch on-resistance noise and the differential amplifier noise of the switch circuit RST stored in the parasitic capacitance $C_{pd}$ at the moment when the switch circuit RST is turned off are transferred to the integration capacity $C_{int}$ with a gain of $C_{pd}/C_{int}$. It should be noted that because the switch on-resistance noise of the switch circuits SH and S1 in the reset mode is observed in the CDS mode almost similarly, it can be thought that the switch on-resistance noise is not transferred to the integration capacity $C_{int}$.

Here, the switch on-resistance noise of the switch circuit S3 caused between the terminals of the capacity $C_{sh1}$ is assumed to be a noise $N_{S3\_cds}$, and the switch on-resistance noise of the switch circuit S5 is assumed to be a noise $N_{S5\_cds}$. Between the terminals of the capacity $C_{sh1}$, charges corresponding to a voltage $V_{sh1}^2$ represented by the following formula (1) are stored as charges caused due to the noise. Hereinafter, because the noise stored in the integration capacity $C_{int}$ after the charges are transferred to the integration capacity $C_{int}$ is a DC component, it is represented by $N_{rst}$ without distinguishing by the source of generated noise. It should be noted that in the CDS mode, the capacity $C_{sh1}$ can be seen as a load capacity of the operational amplifier 41. The inversion input terminal of the operational amplifier 41 is considered to be virtually grounded.

$$V_{sh1}^2 = \int N_{rst}^2 df + \int N_{S3\_cds}^2 df + \int N_{S5\_cds}^2 df + \int N_{amp\_cds}^2 df \quad (1)$$

(Step S30 (Sample Mode))

In the subsequent Step S30, sensing target light is started to enter the image sensor PD, and a pixel signal is sampled. Specifically, charging from the image sensor PD to the integration capacity $C_{int}$ is started, and the output voltage of the operational amplifier 41 depending on the stored charge in the integration capacity $C_{int}$ is charged in the capacity $C_{sh2}$.

Figure 4:
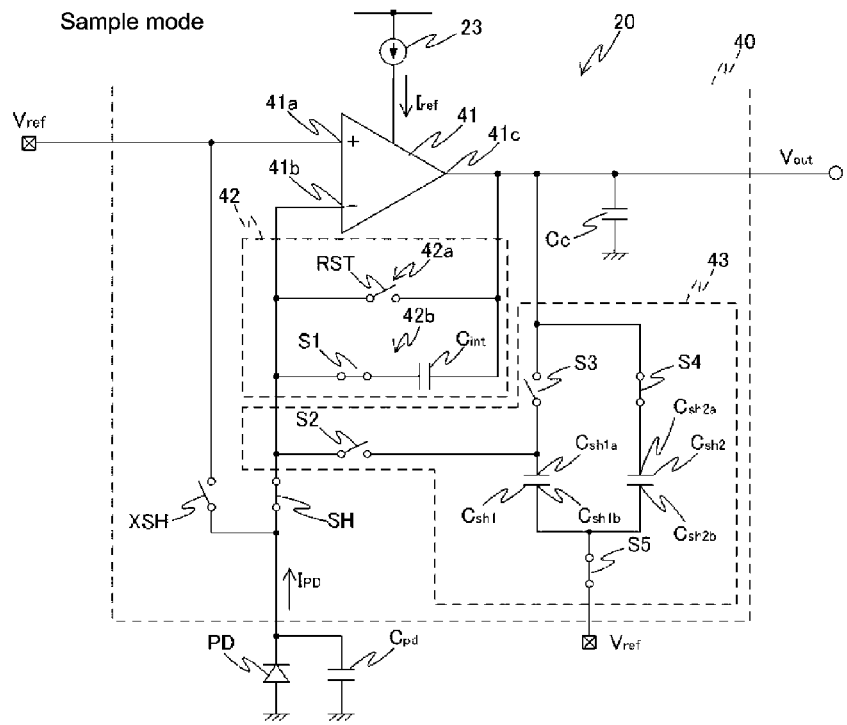
FIG. 4 is an equivalent circuit schematic showing the current/voltage conversion circuit according to this embodiment.

Specifically, after the Step S20 is completed, the switch circuit S3 is turned off, and the complementary switch maintains the on-state of the switch circuit SH (maintains the off-state of the switch circuit XSH) continuously, maintains the off-state of the switch circuits RST and S2 continuously, and maintains the on-state of switch circuits S1, S4, and S5 continuously (FIG. 4). Accordingly, the incident electromagnetic wave on the image sensor PD is converted into current by the image sensor PD, and charges are stored in the integration capacity $C_{int}$ by the current input from the image sensor PD.

As described above, by turning off the switch circuits S2 and S3, the capacity $C_{sh1}$ is separated from the operational amplifier 41. Accordingly, an instantaneous value of the charges stored in the capacity $C_{sh1}$ at the moment when the switch circuit S3 is turned off is sampled in the capacity $C_{sh1}$. Therefore, in the capacity $C_{sh1}$, charges of a DC component corresponding to a voltage $V_{sh1}^2$ represented by the following formula (2a) or (2b) are stored as charges caused due to noise.

$$V_{sh1}^2 = \int N_{rst}^2 df + \int N_{S3\_cds}^2 df + \int N_{S5\_cds}^2 df + \int N_{amp\_cds}^2 df \quad (2a)$$

$$V_{sh1}^2 = \int N_{rst}^2 df + \int N_{S3\_cds}^2 df + \int N_{amp\_cds}^2 df \quad (2b)$$

On the other hand, because the capacity $C_{sh2}$ is still connected to the operational amplifier 41, charges corresponding to a voltage $V_{sh2}^2$ represented by the following formula (3) are stored in the capacity $C_{sh2}$ as charges caused due to noise. It should be noted that in the following formula (3), $N_{S4\_sam}$ represents the switch on-resistance noise of the switch circuit S4 observed during the sampling period of time, $N_{S5\_sam}$ represents the switch on-resistance noise of the switch circuit S5 observed during the sampling period of time, and $N_{S5\_sam}$ represents the differential amplifier noise observed during the sampling period of time. Moreover, the capacity $C_{sh2}$ can be seen as a load capacity of the differential amplifier. The inversion input terminal of the differential amplifier is considered to be virtually grounded.

$$V_{sh2}^2 = \int N_{rst}^2 df + \int N_{S4\_sam}^2 df + \int N_{S5\_sam}^2 df + \int N_{amp\_sam}^2 df \quad (3)$$

Moreover, in the sample mode, a current $I_{pd}$ input from the image sensor PD is gradually stored in the integration capacity $C_{int}$. Therefore, a signal component $V_{out\_sig}$ of the output voltage $V_{out}$ of the operational amplifier 41 at the moment when the step switches from the Step S30 to the Step S40 to be described later is represented by the following formula (4). It should be noted that in the following formula (4), T represents the duration time of the sample mode, and $C_{int}$ represents the capacity value of the integration capacity $C_{int}$.

$$V_{out\_sig} = T \times \frac{I_{pd}}{C_{int}} \quad (4)$$

Charges corresponding to the voltage $V_{out\_sig}$ are generated at both ends of the capacity $C_{sh2}$, and are held at the moment when the step transits from the sample mode (Step S30) to the hold mode (Step S40). After that, the charges corresponding to the voltage $V_{out\_sig}$ are continued to be held at the both ends of the capacity $C_{sh2}$ through the hold mode (Step S40), the amplifier-off-hold mode (Step S50), and the output mode (Step S60).

(Hold Mode (Step S40))

In the subsequent Step S40, the sensing target light is caused to stop entering the image sensor PD, and a pixel signal is sampled. The capacity $C_{sh2}$ that can be seen as a load burden by being connected to the output unit 41c of the operational amplifier 41 is separated from the output unit 41c of the operational amplifier 41. Thus, charges corresponding to the output voltage $V_{out\_sig}$ held in the capacity $C_{sh2}$ at that time are fixed.

Figure 5:
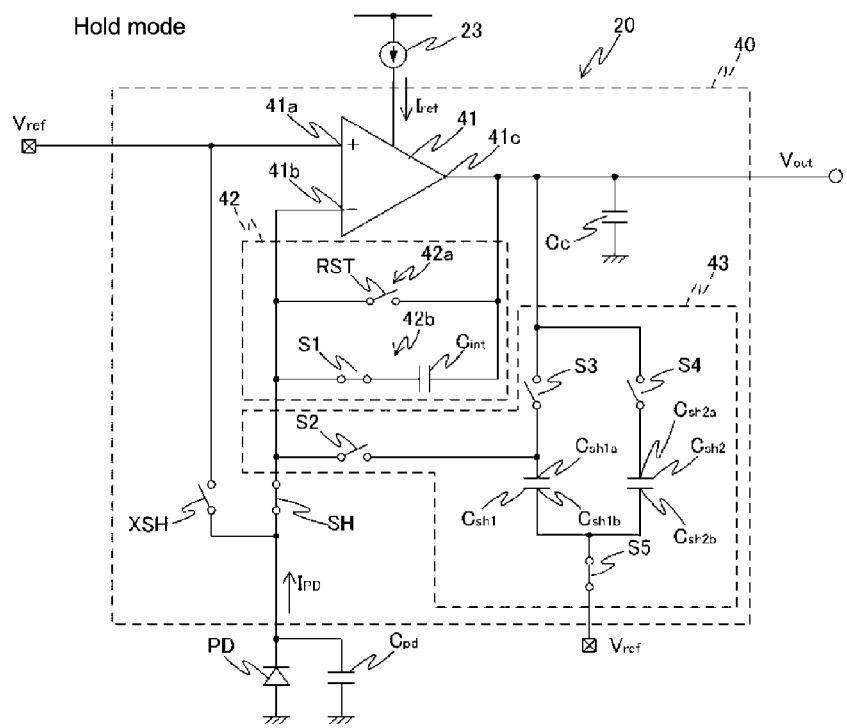
FIG. 5 is an equivalent circuit schematic showing the current/voltage conversion circuit according to this embodiment.

Specifically, the switch circuit S4 is turned off. Moreover, the complementary switch maintains the on-state of the switch circuit SH (maintains the off-state of the switch circuit XSH) continuously, maintains the on-state of the switch circuits S1 and S5 continuously, and maintains the off-state of the switch circuits RST and S3 continuously (FIG. 5).

By turning off the switch circuit S4, the capacity $C_{sh2}$ is separated from the operational amplifier 41. Accordingly, charges of a DC component corresponding to a voltage $V_{sh2}^2$ represented by the following formula (5a) or (5b) are stored in the capacity $C_{sh2}$ because an instantaneous value of the charges stored in the capacity $C_{sh2}$ at the moment when the switch circuit S4 is turned off is sampled as charges caused due to noise.

$$V_{sh2}^2 = \int N_{rst}^2 df + \int N_{S4\_sam}^2 df + \int N_{S5\_sam}^2 df + \int N_{amp\_sam}^2 df \quad (5a)$$

$$V_{sh2}^2 = \int N_{rst}^2 df + \int N_{S4\_sam}^2 df + \int N_{amp\_sam}^2 df \quad (5b)$$

(Amplifier-Off-Hold Mode (Step S50))

In the subsequent Step S50, the charges stored in the capacities $C_{sh1}$ and $C_{sh2}$ are maintained while reducing the consumption of electric power. Accordingly, the image sensor units 20 waits until the output voltage $V_{out}$ is output in the state where the charges stored in the capacities $C_{sh1}$ and $C_{sh2}$, i.e., pixel signal on which correlation double sampling is performed, are maintained while reducing the consumption of electric power.

Figure 6:
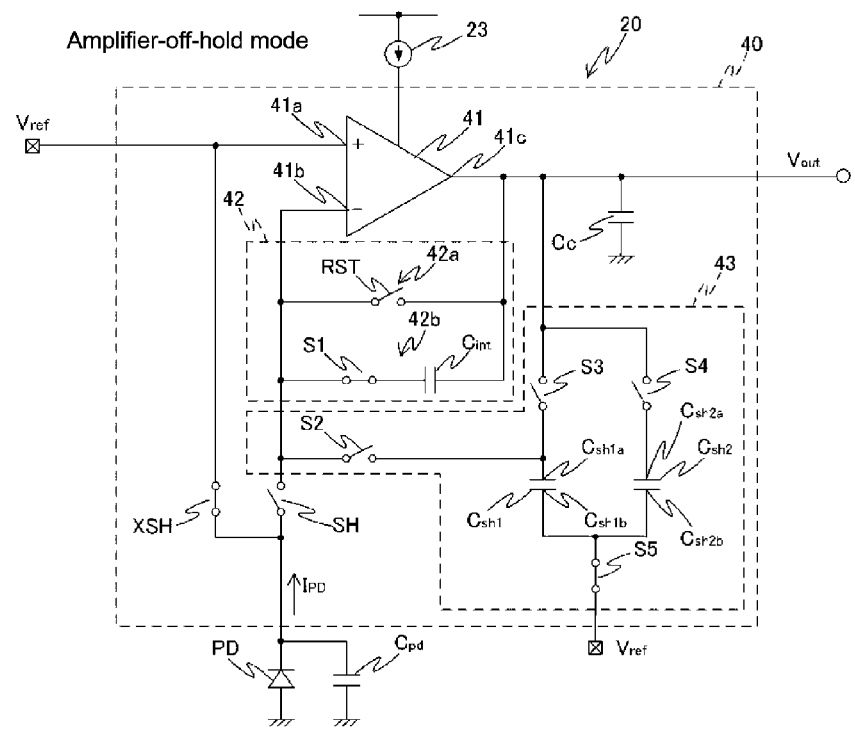
FIG. 6 is an equivalent circuit schematic showing the current/voltage conversion circuit according to this embodiment.

Specifically, the current $I_{ref}$ is caused to stop being supplied from the operational amplifier power supply 23 to the operational amplifier 41 not to drive the operational amplifier 41 (FIG. 6). Moreover, the complementary switch turns on the switch circuit XSH (turns off the switch circuit SH), maintains the off-state of the switch circuits RST, S2, S3, and S4 continuously, and maintains on-state of the switch circuits S1 and S5 continuously. By turning on the switch circuit XSH, the output unit of the image sensor PD is connected to low impedance. Thus, even if an unexpected electromagnetic wave enters the image sensor PD, the potential of the current output terminal of the image sensor PD is not lowered to around ground.

It should be noted that the operations after the amplifier-off-hold period are successively performed in each of the M image sensor units 20 connected to the output wiring 21 that extends in the X-direction.

Specifically, the M image sensor units 20 are connected to the output wiring 21, and the output voltage $V_{out}$ is successively output, to the output wiring 21, from the first image sensor unit 20, the second image sensor unit 20, the third image sensor unit 20, . . . , and the Mth image sensor unit 20. Moreover, in the N output wirings 21, the output voltage $V_{out}$ is successively output to the output wiring 21. Moreover, the N image sensor units 20 connected to one drive wiring that extends in the Y-direction (not shown) are driven at the same time.

(Output Mode)

The image sensor units 20 outputs the output voltage $V_{out}$ depending on the charges stored in the capacities $C_{sh1}$ and $C_{sh2}$ to the output wiring 21 when the output timing has come.

Figure 7:
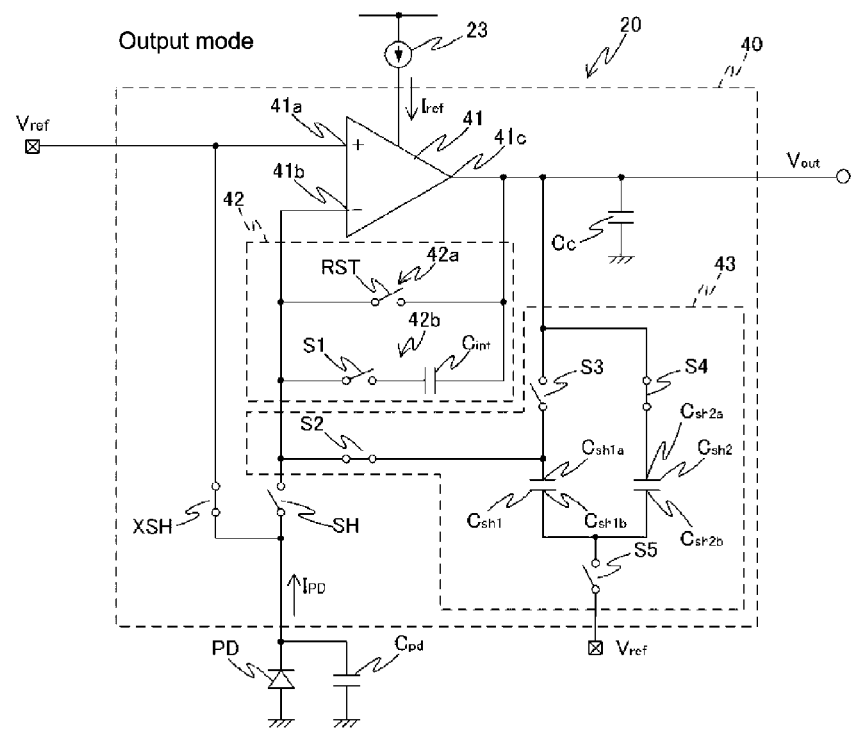
FIG. 7 is an equivalent circuit schematic showing the current/voltage conversion circuit according to this embodiment.

Specifically, the switch circuit S1 is turned off, the switch circuit S2 is turned on, the switch circuit S4 is turned on, and the switch circuit S5 is turned off. The complementary switch turns on the switch circuit SH (turns off the switch circuit XSH), and maintains the off-state of the switch circuits RST and S3 continuously (FIG. 7).

By turning on the switch circuits S2 and S4 and turning off the switch circuits S3 and S5, the capacities $C_{sh1}$ and $C_{sh2}$ connected in series connect the second input unit 41b of the operational amplifier 41 with the output unit 41c. Accordingly, the current/voltage conversion circuit 40 of the image sensor units 20 is connected to the output wiring 21, and the output voltage $V_{out}$ depending on the charges stored in the capacities $C_{sh1}$ and $C_{sh2}$ are output to the output wiring 21.

An output voltage $V_{out\_noi}$ according to the noise signal output from the output unit of the current/voltage conversion circuit 40 is represented by the following formula (6).

$$V_{out\_noi} = -V_{sh1} + V_{sh2} \tag{6}$$

When the left-hand side and the right-hand side in the formula (6) are squared respectively, the following formula (7) is obtained.

$$V_{out\_noi}^2 = V_{sh1}^2 + V_{sh2}^2 - 2 \times V_{sh1} \times V_{sh2} \tag{7}$$

In the formula (7), $V_{sh1} \times V_{sh2}$ can be represented by using the formula (2a) or (2b) and the formula (5a) or (5b). It should be noted that because, in general, the following formula (8) is established between mutually uncorrelated functions a(f) and b(f), $V_{sh1} \times V_{sh2}$ in the formula (7) can be represented by the following formula (9)

$$\int a(f) \times b(f) df = 0 \tag{8}$$

$$V_{sh1} \times V_{sh2} = \sqrt{\int N_{rst}^2 df + \int N_{S3\_cds}^2 df + \int N_{amp\_cds}^2 df} \times \tag{9}$$
$$\sqrt{\int N_{rst}^2 df + \int N_{S4\_sam}^2 df + \int N_{amp\_sam}^2 df} \approx$$
$$\sqrt{\int N_{rst}^2 df + \int N_{rst}^2 df}$$
$$= \int N_{rst}^2 df$$

When the formula (9), the formula (2b), and the formula (5b) are substituted into the formula (7), the following formula (10) is obtained.

$$V_{out\_noi}^2 = \int N_{rst}^2 df + \int N_{S3\_cds}^2 df + \int N_{amp\_cds}^2 df + \int N_{rst}^2 df + \tag{10}$$
$$\int N_{S4\_sam}^2 df + \int N_{amp\_sam}^2 df - 2 \times \int N_{rst}^2 df$$
$$= \int N_{S3\_cds}^2 df + \int N_{amp\_cds}^2 df + \int N_{S4\_sam}^2 df +$$
$$\int N_{amp\_sam}^2 df$$

-continued
$$= \int N_{amp\_cds}^2 df + \int N_{amp\_sam}^2 df + \frac{k \times T}{C_{sh1}} + \frac{k \times T}{C_{sh2}}$$

Specifically, the noise component $V_{out\_noi}$ included in the output voltage Vout is represented by the following formula (11).

$$V_{out\_noi} = \sqrt{\int N_{amp\_cds}^2 df + \int N_{amp\_sam}^2 df + \frac{k \times T}{C_{sh1}} + \frac{k \times T}{C_{sh2}}} \tag{11}$$

On the other hand, regarding a signal component $V_{out\_sig}$ included in the output voltage $V_{out}$, in the sample mode of Step S30, the signal component $V_{out\_sig}$ represented by the formula (4) is generated at the both ends of the capacity $C_{sh2}$. Then, the voltage is held at the both ends of the capacity $C_{sh2}$ at the moment when the step transits from Step S30 to Step S40. After that, because the charges at the both ends of the capacity $C_{sh2}$ are continued to be held through Step S40 to Step S60, the output voltage $V_{out\_sig}$ in Step S60 is represented by the following formula (12).

$$V_{out\_sig} = \frac{T \times I_{pd}}{C_{int}} \tag{12}$$

The output voltage $V_{out}$ is represented by the following formula (13) obtained from the square root of sum of squares of the output noise component $V_{out\_noi}$ in the formula (11) and the signal component $V_{out\_sig}$ in the formula (12).

$$V_{out} = \sqrt{(V_{out\_sig})^2 + (V_{out\_noi})^2} \tag{13}$$

Because the output voltage $V_{out}$ calculated as described above includes no switch on-resistance noise of the switch circuit RST, the current/voltage conversion circuit 40 according to this embodiment is capable of performing current/voltage conversion with low noise (high signal-to-noise (S/N) ratio) and high resistance to disturbance. Moreover, even if a load connected to the output unit of the current/voltage conversion circuit 40 has any form, the load is driven by the differential amplifier constituted by the operational amplifier 41, and the current/voltage conversion circuit 40 does not exchanges charges with the capacity $C_{sh1}$ and the capacity $C_{sh2}$. Therefore, the current/voltage conversion circuit 40 according to this embodiment has high resistance to a load fluctuation and an output voltage fluctuation, and excellent linearity. Therefore, it is possible to achieve the current/voltage conversion circuit 40 for micro-optical sensing with high current/voltage conversion efficiency (increasing $1/C_{int}$) and the increased area of the image sensors 230 (increasing $C_{pd}$). Specifically, it is possible to achieve the current/voltage conversion circuit 40 including the image sensor PD having the large area with low noise. Moreover, if the embodiment of the present disclosure is applied to an X-ray imaging panel receiver circuit, it is possible to perform current/voltage conversion with lower noise, and to capture an image with high quality.

(2) Second Embodiment

Image Sensor Unit

In this embodiment, the image sensor unit will be described in detail.

Figure 8A:
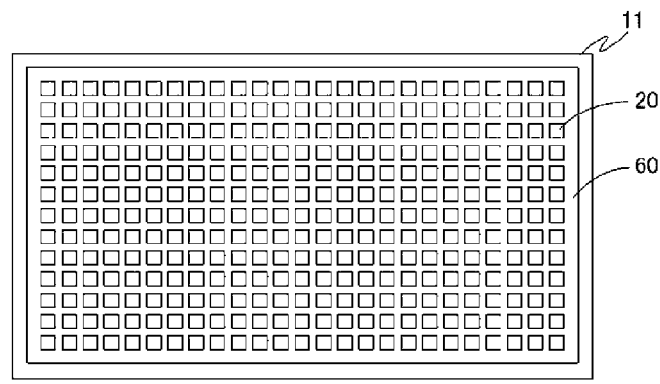
FIGS. 8A and 8B are a diagram showing a configuration example of an imaging panel and a diagram showing the state where an imaging element unit of one pixel is mounted on a wiring layer.
Figure 8B:
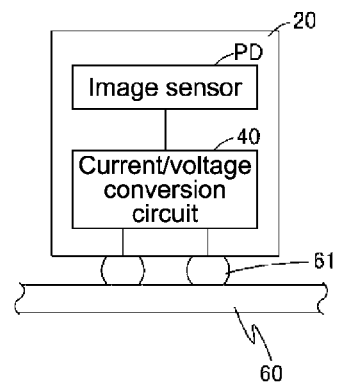

FIG. 8(a) shows a configuration example of the imaging panel 11, and FIG. 8(b) shows the state where the image sensor unit 20 of one pixel is mounted on a wiring layer 60.

The image sensor unit 20 includes the image sensor PD (e.g., photodiode) and the current/voltage conversion circuit 40, and is a micro light-receiving chip in which the image sensor PD and the current/voltage conversion circuit 40 are integrally formed with resin on a pixel-by-pixel basis. Specifically, the plane shape of the image sensor units 20 is a rectangular shape, 200 μm on a side.

Regarding the image sensor unit 20, a solder bump 61 being a projected solder terminal is formed on a mount surface of the wiring layer 60 for mounting the image sensor unit 20. The image sensor unit 20 is connected to the wiring layer 60 via the solder bump 61. Accordingly, the current/voltage conversion circuit 40 of the image sensor unit 20 is electrically connected to the wiring layer 60.

In the wiring layer 60, a wiring 63 (see FIG. 11 to be described later) that connects the current/voltage conversion circuit 40 with an external processing unit (e.g., A/D conversion unit) is formed. The image sensor unit 20 is flip-chip-mounted (FC mounting) on the wiring layer 60 by the solder bump 61 on a pixel-by-pixel basis. The wiring layer 60 is formed of a flexible printed-wiring board, for example.

It should be noted that the FC mounting represents that a substrate is electrically connected to the surface of a chip not by a wiring but by solder bumps arranged in an array pattern, unlike wire bonding. With such a configuration, it is possible to increase the area of the imaging panel 11 and to produce the imaging panel 11 at a low cost.

Figure 9:
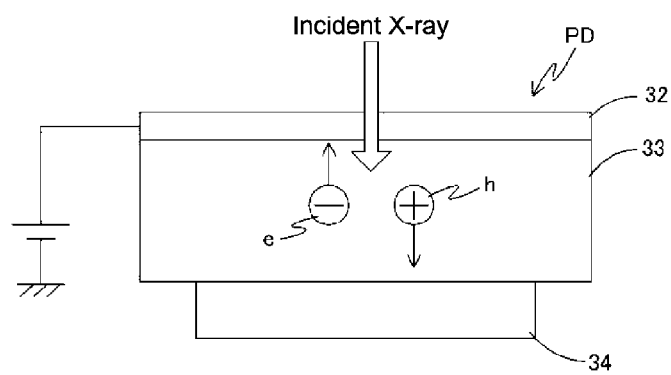
FIG. 9 is a diagram schematically showing the cross section of a flat panel detector (FPD) that employs a direct conversion method.

FIG. 9 is a conceptual cross-sectional view of a flat panel detector (FPD) that employs a direct conversion method. In the FPD that employs a direct conversion method and is shown in FIG. 9, the image sensor PD has a structure where a bias electrode 32, an X-ray conversion layer 33 formed of a semiconductor crystal such as an amorphous selenium semiconductor (a-Se), and a pixel electrode 34 are laminated.

The X-ray emitted from an X-ray generating apparatus (not shown) is transmitted through a subject (not shown) such as a living body. After that, the X-ray passes through the bias electrode 32 and enters the X-ray conversion layer 33. In the X-ray conversion layer 33, charges (electron-hole pair) depending on the amount of incident X-rays are generated. Because a positive potential is given to the bias electrode 32, an electron e having a negative charge is moved to the side of the bias electrode 32, and an electron hole h having a positive charge is moved to the side of the pixel electrode 34. The bias electrode 32 is connected to the switch circuit SH and the switch circuit XSH, and the electron e moved to the side of the bias electrode 32 charges the integration capacity $C_{int}$ of the feedback unit 42 via the switch circuit SH.

Figure 10:
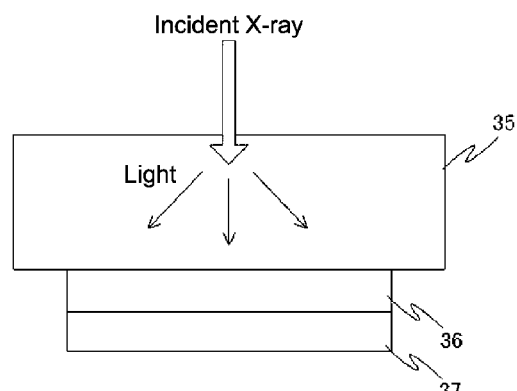
FIG. 10 is a schematic partial cross-sectional view showing a flat panel detector (FPD) that employs an indirect conversion method.

FIG. 10 is a conceptual partial cross-sectional view of a flat panel detector (FPD) that employs an indirect conversion method. In the FPD that employs an indirect conversion method and is shown in FIG. 10, the image sensor PD has a configuration where a scintillator layer 35, a photodiode 36, and a pixel electrode 37 are laminated.

The X-ray emitted from the X-ray generating apparatus (not shown) is transmitted through a subject (not shown) such as a living body. After that, the X-ray enters the scintillator layer 35. In the scintillator layer 35, the incident X-ray is converted into an optical signal. Then, the magnitude of the optical signal is converted into an electric signal that represents the magnitude of a charge by the photodiode 36. The pixel electrode 37 is connected to the switch circuit SH and the switch circuit XSH, and generated charges charge the integration capacity $C_{int}$ of the feedback unit 42 via the switch circuit SH.

Figure 11:
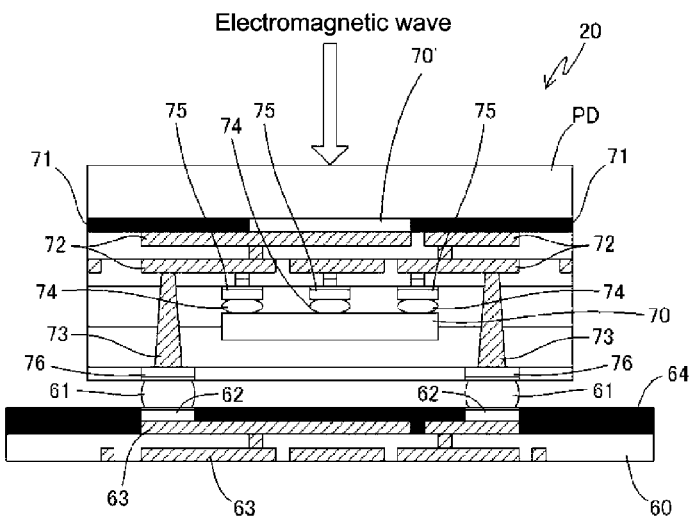
FIG. 11 is a diagram showing the state where an imaging element unit is mounted on a wiring layer.

FIG. 11 is a diagram showing the state where the image sensor unit 20 is mounted on the wiring layer 60. It should be noted that the image sensor unit 20 shown in FIG. 11 includes a light-receiving integrated circuit (IC) 70 in which the image sensor PD and the current/voltage conversion circuit 40 (not shown) are formed into a chip. Furthermore, the image sensor unit 20 includes a light-shielding film 71, a wiring 72, a via-hole 73, under bump metals (UMB) 75 and 76, and the solder bump 61 in addition to the light-receiving IC 70.

It should be noted that the light-shielding film 71 covers surfaces other than a light-receiving surface 70' of the light-receiving IC 70. The light-receiving IC 70 is solder-mounted by a light receiving IC solder bump 74, and is connected to the wiring 72 via the light-receiving IC solder bump 74 and the under bump metal 75. It should be noted that the under bump metals 75 and 76 and an under bump metal 62 are underlying metal layers of a solder bump for preventing solder from diffusing to ensure favorable junction to the solder. For example, the under bump metals 62, 75, and 76 are formed of nickel (Ni). Moreover, the wiring 72 is connected to one end of the via-hole 73, and the other end of the via-hole 73 is connected to the under bump metal 76. It should be noted that in the via-hole 73, conductive metal is filled based on a via-fill plating method.

The image sensor units 20 is FC-mounted on the wiring layer 60 via the solder bump 61 and the under bump metal 62 formed on the wiring 63. In the wiring layer 60, the under bump metal 62 is provided at the soldering portion. On the surface of the wiring layer 60, a light-shielding film 64 is formed. Moreover, a multilayered wiring 63 is formed in the wiring layer 60.

It should be noted that when an electromagnetic wave (X-ray) enters the light-receiving surface 70' of the image sensor unit 20, the image sensor PD (not shown) in the light-receiving IC 70 converts the electromagnetic wave into a current signal. The current signal is converted into a voltage signal by the current/voltage conversion circuit 40 (not shown) in the light-receiving IC 70. Then, the voltage signal generated in the image sensor unit 20 is transmitted to a processing unit in a subsequent stage via the wiring 63 of the wiring layer 60.

Figure 12:
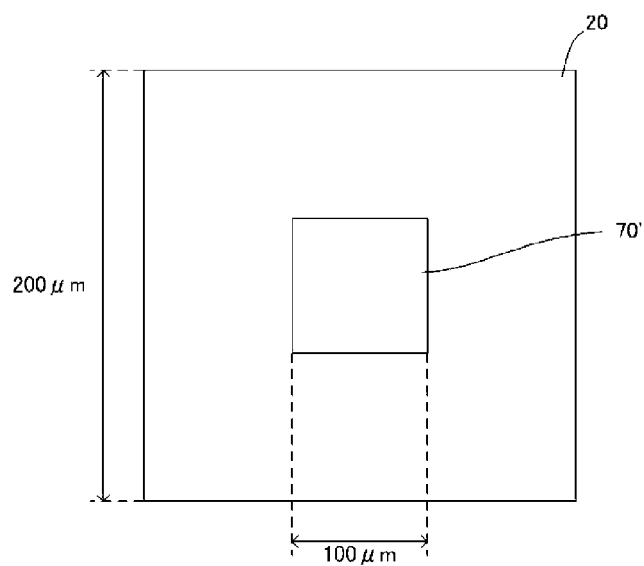
FIG. 12 is a schematic diagram showing an imaging element unit viewed from the upper side.

FIG. 12 is a schematic diagram of the image sensor unit 20 viewed from the upper side. The image sensor unit 20 is a micro-chip whose plane shape is rectangular, not more than 200 μm on a side, for example. Moreover, on the upper surface of the image sensor unit 20, the light-receiving surface 70' (see FIG. 11) is formed. The light-receiving surface 70' has a rectangular shape, not more than 100 μm on a side, for example.

Figure 13:
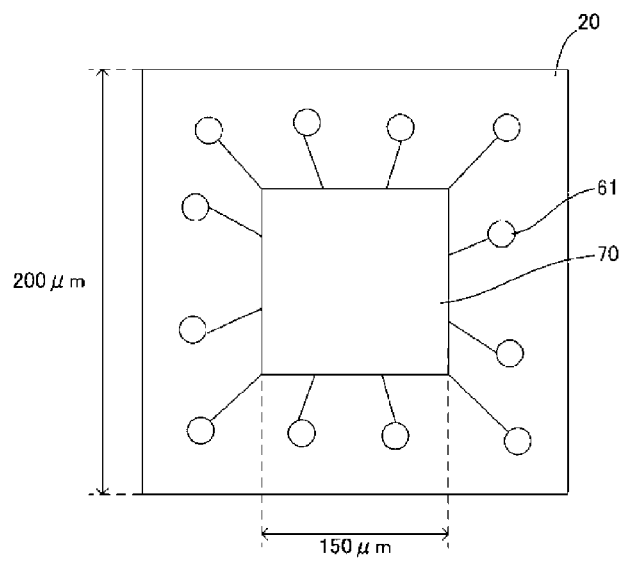
FIG. 13 is a schematic diagram showing an imaging element unit viewed from the lower side.

FIG. 13 is a schematic diagram of the image sensor unit 20 viewed from the lower side. On the rear surface of the image sensor unit 20, for example, 12 solder bumps 61 are formed. The solder bump 61 has a diameter of, for example, not more than 15 μm. Moreover, the light-receiving IC 70 is a rectangular micro-chip having a larger plane shape than the light-receiving surface 70', not more than 150 μm on a side, for example. It should be noted that the thickness of the image sensor unit 20 (excluding the thickness of the solder bump 61) is not more than 20 μm, for example. It should be noted that these values are merely an example.

(Modified Example of Image Sensor Unit)

Figure 14:
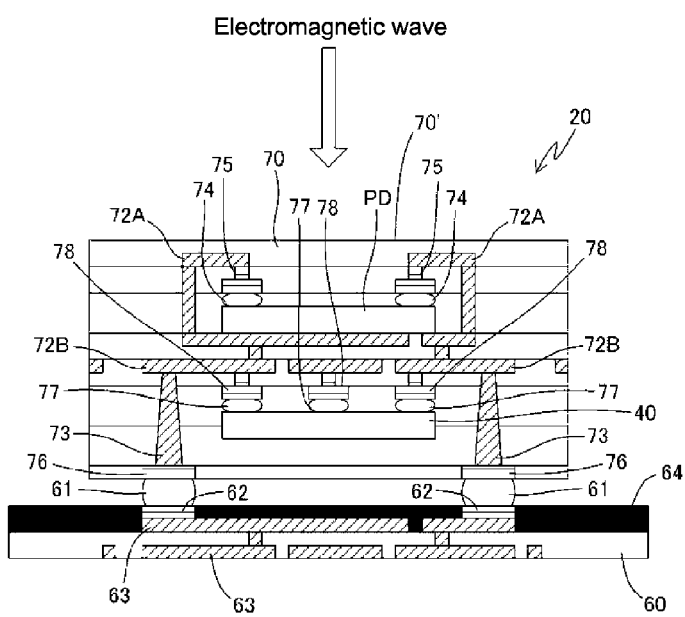
FIG. 14 is a schematic cross-sectional view showing a modified example of an imaging element unit.

FIG. 14 is a schematic cross-sectional view of a modified example of the image sensor unit. In the modified example of the image sensor unit, the image sensor unit 20 has a two layered structure. Specifically, the image sensor PD is arranged in the upper layer on which an electromagnetic wave is incident, and the current/voltage conversion circuit 40 is arranged in the lower layer.

It should be noted that the image sensor unit 20 includes wirings 72A and 72B, the under bump metals 75 and 76, an under bump metal 78, the light-receiving IC solder bump 74, and a light-receiving IC solder bump 77 in addition to the image sensor PD and the current/voltage conversion circuit 40. Then, the image sensor PD is solder-mounted by the light-receiving IC solder bump 74, and is connected to the wiring 72A via the light-receiving IC solder bump 74 and the under bump metal 75. Moreover, the current/voltage conversion circuit 40 is solder-mounted by the light-receiving IC solder bump 77, and is connected to the wiring 72B via the light-receiving IC solder bump 77 and the under bump metal 78. The wiring 72A and the wiring 72B are connected to each other. The wiring 72B is further connected to the via-hole 73. The via-hole 73 is connected to the under bump metal 76. It should be noted that in the via-hole 73, conductive metal is filled based on a via-fill plating method. Then, the image sensor unit 20 is FC-mounted on the wiring layer 60 via the solder bump 61 and the under bump metal 62.

As described above, because the image sensor PD is arranged in the upper layer on which light is incident in the image sensor unit 20, it is possible to increase the area of the light-receiving surface on one chip and to improve the light-receiving efficiency. Moreover, because the pitch between the image sensor units can be narrowed, it is possible to increase the number of image sensor units that can be mounted per unit area and to improve the resolution of the imaging panel. For example, the mount pitch when the image sensor units 20 are FC-mounted on the wiring layer 60 is not more than 420 μm.

Figure 15:
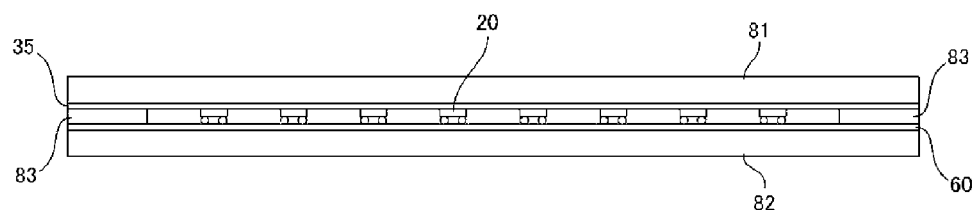
FIG. 15 is a diagram showing a configuration example of an imaging apparatus (flat panel detector) that employs an indirect conversion method.

FIG. 15 shows a configuration example of the imaging apparatus (flat panel detector) 10 that employs an indirect conversion method. The imaging apparatus (flat panel detector) 10 includes a first substrate 81 formed of glass having a thickness of 0.7 mm and a second substrate 82 formed of glass having a thickness of 0.7 mm. The edge portions of the first substrate 81 and the second substrate 82 are sealed by a sealing member 83. Between the first substrate 81 and the second substrate 82, the image sensor unit 20 including the scintillator layer 35 is provided. Then, as described above, the image sensor unit 20 and an image sensor unit 120 are FC-mounted on the wiring layer 60. The scintillator layer 35 is formed on the surface of the first substrate 81 opposed to the image sensor unit 20.

In the existing imaging apparatus (flat panel detector), after a TFT array, image sensor, or the like is formed on a glass substrate, a scintillator layer is formed on an image sensor array with a vacuum process.

In contrast, in the imaging apparatus (flat panel detector) 10 shown in FIG. 15, the image sensor PD and the current/voltage conversion circuit 40 are integrally formed, and the light-receiving IC 70 of the image sensor unit 20 in which the solder bump 61 is formed is arranged in the wiring layer 60 on a pixel-by-pixel basis, and is FC-mounted by the solder bump 61. Therefore, it is possible to increase the area of the imaging apparatus easily. Moreover, because the imaging apparatus is produced based on the FC mounting, a large and expensive mounting apparatus is unnecessary and it is possible to produce an imaging apparatus (flat panel detector) having the large area at a low cost (in large quantities).

If the first substrate 81 and the second substrate 82 are formed of a film, it is possible to provide flexibility to the imaging apparatus (flat panel detector) 10. For example, the first substrate 81 only needs to include a polyethylene terephthalate film (PET film), and the second substrate 82 only needs to include a polyimide film having heat resistance.

The X-ray is normally emitted from a point light source such as an X-ray generating apparatus. It may be impossible to bend the existing imaging apparatus (flat panel detector) because it is produced with high-temperature deposition and thus a plane glass plate is used for it. Therefore, as the irradiation position is away from the central position to which the X-ray is applied, the distance of the X-ray to the irradiation surface of the imaging apparatus changes. Therefore, in the case where an image is captured with a large area, accurate image information can be obtained at the central position to which the X-ray is applied and the positions around the central position. However, as the irradiation position is away from the central position and the positions around the central position, an obtained image is smudgy. Therefore, in the existing imaging apparatus, a plurality of portions are imaged and connection portions of a plurality of image screens are connected with image processing to generate one screen in the case where an image is captured with a large area.

On the other hand, because the imaging apparatus according to this embodiment can be bent, it is possible to bend the imaging apparatus so that the distance from the X-ray source to the irradiation surface of the imaging apparatus is the same as much as possible. Therefore, even in the case where an image is captured with a large area, the existing operation such as imaging a plurality of portions and connecting a plurality of image screens is unnecessary. Therefore, it is possible to easily obtain accurate image information with one-time imaging.

Figure 16:
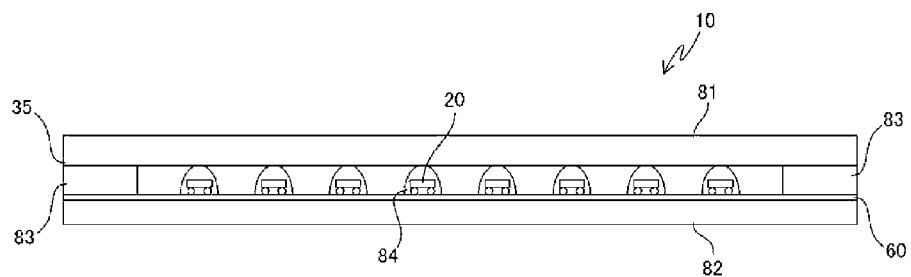
FIG. 16 is a diagram showing a modified example of the imaging apparatus (flat panel detector)
Figure 17:
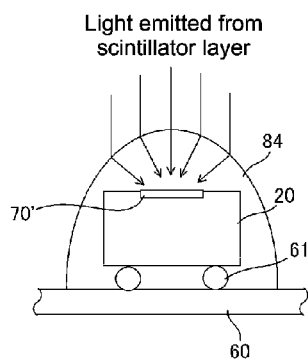
FIG. 17 is an enlarged view of one of imaging element units shown in FIG. 16.

FIG. 16 shows a modified example of the imaging apparatus (flat panel detector) 10. In the modified example, a lens is formed on the light-receiving surface of the image sensor unit 20. Specifically, after the image sensor units 20 are FC-mounted on the wiring layer 60, a dispenser is used to perform a potting process of a transparent resin 84 on the respective image sensor units 20, for example. It is possible to form a lens by the transparent resin 84. FIG. 17 is an enlarged view of the image sensor unit 20. Light emitted from the scintillator layer 35 is refracted by the transparent resin 84, and is collected on the light-receiving surface 70' of the image sensor unit 20. Accordingly, it is possible to improve the light-receiving efficiency.

Figure 18:
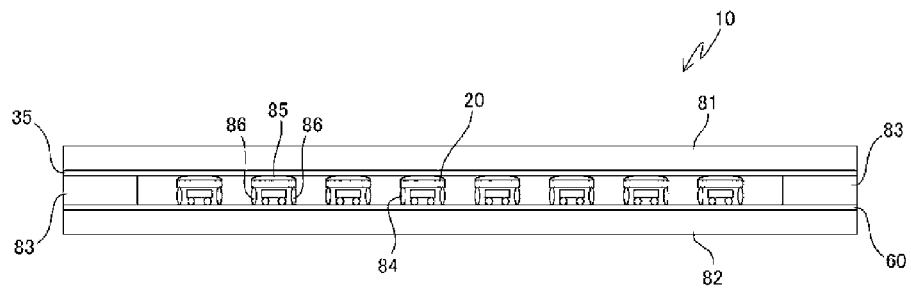
FIG. 18 is a diagram showing another modified example of the imaging apparatus (flat panel detector)

FIG. 18 shows another modified example of the imaging apparatus (flat panel detector) 10. In the modified example, a lens unit 85 is provided on the upper side of the respective image sensor units 20. In the lens unit 85 formed of glass, plastic, or the like, a lens unit solder bump 86 is formed. The lens unit 85 is FC-mounted on the wiring layer 60 so as to cover the image sensor unit 20. The lens unit 85 collects light emitted from the scintillator layer 35 into the light-receiving surface of the image sensor unit 20. It should be noted that it is important to match the central optical axis of the lens unit 85 with the center of the light-receiving surface of the image sensor unit 20. In this case, because the lens unit 85 is solder-mounted on the wiring layer 60 via the lens unit solder bump 86, the position thereof is automatically corrected by the self-alignment effects of the solder. It should be noted that the self-alignment effects represent a phenomenon where a part is moved by the surface tension of the solder and the part is automatically moved to the vicinity of the center of a land. It is possible to match the central optical axis with the center of the light-receiving surface of the image sensor unit 20 with error within ±1 μm to the self-alignment effects only by introducing it into a reflow furnace thanks.

Figure 19:
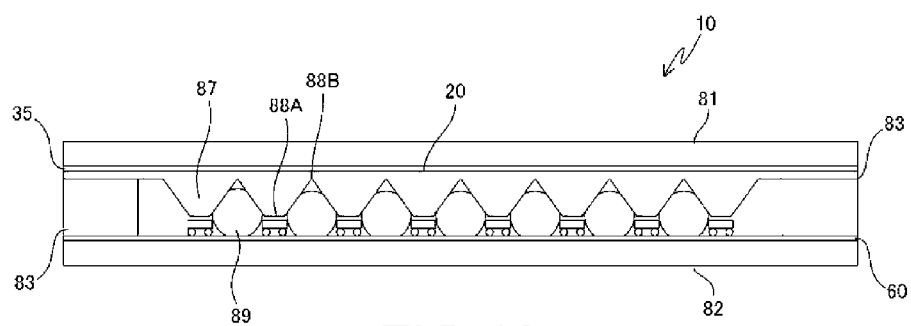
FIG. 19 is a diagram showing still another modified example of the imaging apparatus (flat panel detector)
Figure 20:
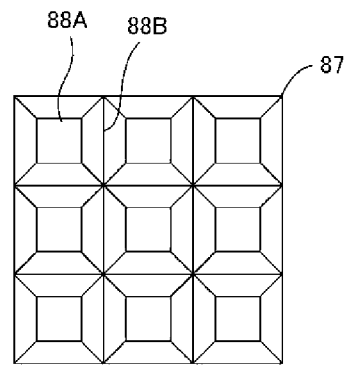
FIG. 20 is a diagram showing a part of the concavo-convex shape of a PET substrate viewed from a side of the imaging element unit.
Figure 21:
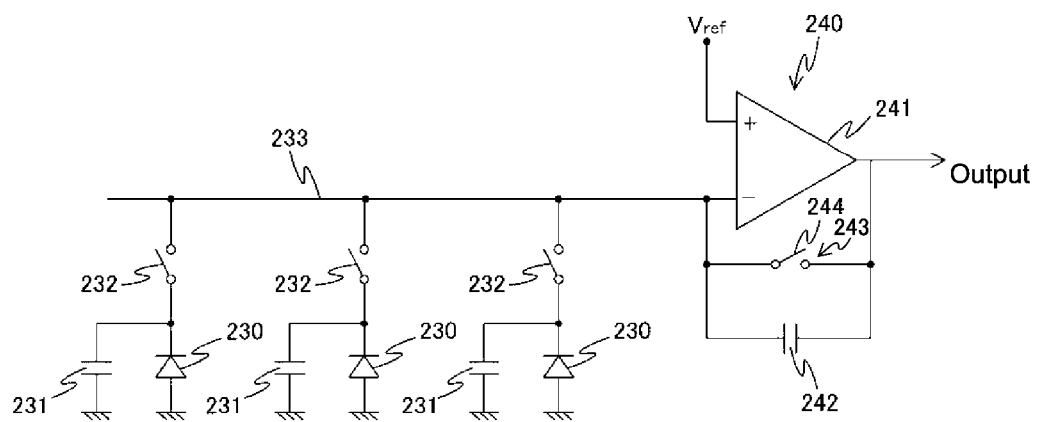
FIG. 21 is a diagram showing an exemplary equivalent circuit of an image sensor and a current/voltage conversion circuit constituting the existing flat panel detector.

FIG. 19 shows another modified example of the imaging apparatus (flat panel detector) 10. In the modified example, a substrate having a convex portion and a concave portion is provided on the upper side of the light-receiving surface of the image sensor unit 20. Specifically, between the scintillator layer 35 and the image sensor unit 20, a PET substrate 87 is provided. Then, on a surface of the PET substrate 87 opposed to the image sensor unit 20, a concavo-convex shape is formed for each image sensor unit 20. Specifically, on the surface of the PET substrate 87 opposed to the image sensor unit 20, a convex portion 88A and a concave portion 88B are formed. FIG. 20 shows a part of the concavo-convex shape of the PET substrate 87 viewed from the side of the image sensor unit. The convex portion 88A totally reflects light emitted from the scintillator layer 35, and is arranges so that the totally reflected light is collected on the light receiving surface of the image sensor unit 20. Moreover, between the wiring layer 60 and the concave portion 88B formed between two convex portions 88A, a mounting solder bump 89 having a large diameter is formed. The PET substrate 87 is mounted on the wiring layer 60 via the mounting solder bump 89. It should be noted that it is important to decide the positions of the tip portion of the convex portion 88A and the light-receiving surface of the image sensor unit 20. However, because the mounting solder bump 89 is formed between the concave portion 88B and the wiring layer 60, the positions are automatically corrected by the self-alignment effects of solder. Specifically, it is possible to match the tip portion of the convex portion 88A with the light-receiving surface of the image sensor unit 20 only by introducing it into a reflow furnace thanks to the self-alignment effects, and to automatically correct the position.

(3) Conclusion

As described above, the imaging apparatus 10 according to the embodiment of the present disclosure includes the image sensor PD that converts an incident electromagnetic wave into current and the current/voltage conversion circuit 40 that converts the current input from the image sensor PD into voltage, and the current/voltage conversion circuit 40 includes the operational amplifier 41 that outputs voltage depending on the current input from the image sensor PD and has a configuration where the CDS unit 43 that performs correlation double sampling on the output of the operational amplifier 41 is provided between input/output terminals of the operational amplifier 41. Therefore, it is possible to remove the switch on-resistance noise component from the output of the current/voltage conversion circuit 40 and to achieve noise reduction for micro-optical sensing.

It should be noted that embodiments of the present disclosure are not limited to the above-mentioned embodiments or modified examples, and include a configuration obtained by replacing the configurations disclosed in the above-mentioned embodiments and modified examples with each other or changing the combination thereof, a combination obtained by replacing the configurations disclosed in well-known techniques, and the above-mentioned embodiments and modified examples with each other or changing the combination thereof, and the like. Moreover, the technical range of the embodiments of the present disclosure is not limited to the above-mentioned embodiments, and includes matters described in claims and equivalents thereof.

The present disclosure may also take the following configurations.

(A) An imaging apparatus, including:
an image sensor configured to convert an incident electromagnetic wave into current;
a current/voltage conversion circuit that is configured to convert the current input from the image sensor into voltage and includes an operational amplifier configured to output voltage corresponding to the current input from the image sensor; and
a sampling circuit that is configured to sample output of the operation amplifier and is provided between input/output terminals of the operational amplifier.

(B) The imaging apparatus according to (A) above, in which
the sampling circuit is a correlation double sampling circuit that performs correlation double sampling on the output of the operation amplifier.

(C) The imaging apparatus according to (A) or (B) above, in which
the sampling circuit includes a combination of a capacity and a switch circuit.

(D) The imaging apparatus according to any one of (A) to (C) above, in which
the operational amplifier includes
a first input unit connected to a predetermined voltage source,
a second input unit connected to the image sensor via a first switch circuit, and
an output unit, and
a feedback unit that provides feedback of output voltage of the output unit to the second input unit is provided to the operation amplifier, the feedback unit including a feedback capacity unit and a short circuit, the feedback capacity unit being configured to switch on and off of the feedback from the output unit to the second input unit via an integration capacity, the short circuit being configured to reset a stored charge by causing short circuit in the integration capacity.

(E) The imaging apparatus according to any one of (A) to (D) above, in which
the sampling circuit includes a first sampling unit configured to sample a noise component of output voltage of the operation amplifier and a second sampling unit configured to sample the output voltage of the operation amplifier.

(F) The imaging apparatus according to (E) above, in which
the first sampling unit includes a first capacity,
the second sampling unit includes a second capacity,
one terminal of the first capacity is connected to the second input unit of the operation amplifier via a second switch circuit and to the output unit of the operational amplifier via a third switch circuit,
one terminal of the second capacity is connected to the second input unit of the operation amplifier via a firth switch circuit, and
the other terminal of the first capacity and the other terminal of the second capacity are connected to the predetermined voltage source via a fifth switch circuit.

(G) The imaging apparatus according to any one of (A) to (F), in which
a plurality of imaging sensors and a plurality of current/voltage conversion circuits are arranged in a two-dimensional matrix pattern.

(H) A current/voltage conversion circuit that converts current input from an image sensor into voltage, including:
an operational amplifier configured to output voltage depending on the current input from the image sensor; and a sampling circuit that is configured to sample output of the operation amplifier and is provided between input/output terminals of the operation amplifier, the image sensor being configured to convert an incident electromagnetic wave into the current.

(I) An imaging method of converting current input from an image sensor into voltage, including:

sampling switch on-resistance noise of a switch circuit configured to reset an integration capacity of an operational amplifier;

sampling the voltage output from the operation amplifier depending on current input from the image sensor; and reducing the switch on-resistance noise from the voltage to output the voltage, the operational amplifier being configured to output voltage depending on the current input from the image sensor, the image sensor being configured to convert an incident electromagnetic wave into the current.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus, comprising:
    an image sensor configured to convert an incident electromagnetic wave into current;
    a current/voltage conversion circuit that is configured to convert the current input from the image sensor into voltage, and includes an operational amplifier that is configured to output voltage corresponding to the current input from the image sensor and includes a first input unit, a second input unit, and an output unit; and
    a sampling circuit that is configured to sample output of the operation amplifier, is provided between the second input unit and the output unit of the operational amplifier, and includes a first sampling unit and a second sampling unit respectively disposed between a predetermined voltage source and the output unit.

2. The imaging apparatus according to claim 1, wherein the sampling circuit is a correlation double sampling circuit that performs correlation double sampling on the output of the operation amplifier.

3. The imaging apparatus according to claim 1, wherein the sampling circuit includes a combination of a capacity and a switch circuit.

4. The imaging apparatus according to claim 1, wherein the first input unit is connected to the predetermined voltage source,
    the second input unit is connected to the image sensor via a first switch circuit, and
    a feedback unit that provides feedback of output voltage of the output unit to the second input unit is provided to the operation amplifier, the feedback unit including a feedback capacity unit and a short circuit, the feedback capacity unit being configured to switch on and off of the feedback from the output unit to the second input unit via an integration capacity, the short circuit being configured to reset a stored charge by causing short circuit in the integration capacity.

5. The imaging apparatus according to claim 1, wherein the first sampling unit is configured to sample a noise component of output voltage of the operation amplifier and the second sampling unit is configured to sample the output voltage of the operation amplifier.

6. The imaging apparatus according to claim 5, wherein the first sampling unit includes a first capacity,
    the second sampling unit includes a second capacity,
    one terminal of the first capacity is connected to the second input unit of the operation amplifier via a second switch circuit and to the output unit of the operational amplifier via a third switch circuit,
    one terminal of the second capacity is connected to the output unit of the operation amplifier via a fourth switch circuit, and
    the other terminal of the first capacity and the other terminal of the second capacity are connected to the predetermined voltage source via a fifth switch circuit.

7. The imaging apparatus according to claim 6, wherein the one terminal of the second capacity is connected to the second input unit of the operation amplifier via the fourth switch circuit, the third switch circuit, and the second switch circuit.

8. The imaging apparatus according to claim 1, wherein a plurality of image sensors and a plurality of current/voltage conversion circuits are arranged in a two-dimensional matrix pattern.

9. The imaging apparatus according to claim 1, wherein the incident electromagnetic wave is an X-ray.

10. The imaging apparatus according to claim 1, wherein the first sampling unit and the second sampling unit are disposed in parallel.

11. A current/voltage conversion circuit that converts current input from an image sensor into voltage, comprising:
    an operational amplifier that is configured to output voltage depending on the current input from the image sensor and includes a first input unit, a second input unit, and an output unit; and
    a sampling circuit that is configured to sample output of the operation amplifier, is provided between the second input unit and the output unit of the operation amplifier, and includes a first sampling unit and a second sampling unit respectively disposed between a predetermined voltage source and the output unit, the image sensor being configured to convert an incident electromagnetic wave into the current.

12. The current/voltage conversion circuit according to claim 11, wherein
    the sampling circuit is a correlation double sampling circuit that performs correlation double sampling on the output of the operation amplifier.

13. The current/voltage conversion circuit according to claim 11, wherein
    the sampling circuit includes a combination of a capacity and a switch circuit.

14. The current/voltage conversion circuit according to claim 11, wherein
    the first input unit is connected to the predetermined voltage source,
    the second input unit is connected to the image sensor via a first switch circuit, and
    a feedback unit that provides feedback of output voltage of the output unit to the second input unit is provided to the operation amplifier, the feedback unit including a feedback capacity unit and a short circuit, the feedback capacity unit being configured to switch on and of of the feedback from the output unit to the second input unit via an integration capacity, the short circuit being configured to reset a stored charge by causing short circuit in the integration capacity.

15. The current/voltage conversion circuit according to claim 11, wherein
    the first sampling unit is configured to sample a noise component of output voltage of the operation amplifier and the second sampling unit is configured to sample the output voltage of the operation amplifier.

16. The current/voltage conversion circuit according to claim 15, wherein the first sampling unit includes a first capacity, the second sampling unit includes a second capacity, one terminal of the first capacity is connected to the second input unit of the operation amplifier via a second switch circuit and to the output unit of the operational amplifier via a third switch circuit, one terminal of the second capacity is connected to the output unit of the operation amplifier via a fourth switch circuit, and the other terminal of the first capacity and the other terminal of the second capacity are connected to the predetermined voltage source via a fifth switch circuit.

17. The current/voltage conversion circuit according to claim 16, wherein the one terminal of the second capacity is connected to the second input unit of the operation amplifier via the fourth switch circuit, the third switch circuit, and the second switch circuit.

18. The current/voltage conversion circuit according to claim 11, wherein a plurality of current/voltage conversion circuits are arranged in a two-dimensional matrix pattern.

19. The current/voltage conversion circuit according to claim 11 wherein the incident electromagnetic wave is an X-ray.

20. An imaging method of converting current input from an image sensor into voltage, comprising:

sampling switch on-resistance noise of a switch circuit configured to reset an integration capacity of an operational amplifier that includes a first input unit, a second input unit, and an output unit;

sampling the voltage output from the operation amplifier depending on current input from the image sensor via a first sampling unit and a second sampling unit respectively disposed between a predetermined voltage source and the output unit; and reducing the switch on-resistance noise from the voltage to output the voltage, the operational amplifier being configured to output voltage depending on the current input from the image sensor, the image sensor being configured to convert an incident electromagnetic wave into the current.

* * * * *